US006334909B1

(12) United States Patent
Okamura et al.

(10) Patent No.: US 6,334,909 B1
(45) Date of Patent: Jan. 1, 2002

(54) COLD-ACCUMULATING MATERIAL AND COLD-ACCUMULATING REFRIGERATOR USING THE SAME

(75) Inventors: Masami Okamura; Tomohisa Arai; Keisuke Hashimoto, all of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/331,157

(22) PCT Filed: Oct. 20, 1998

(86) PCT No.: PCT/JP98/04749

§ 371 Date: Jun. 17, 1999

§ 102(e) Date: Jun. 17, 1999

(87) PCT Pub. No.: WO99/20956

PCT Pub. Date: Apr. 29, 1999

(51) Int. Cl.[7] .................................................... H01F 1/053
(52) U.S. Cl. ................................... 148/303; 62/3.1; 62/6
(58) Field of Search ................................. 148/301, 303; 420/416; 62/3.1, 6

(56) References Cited

U.S. PATENT DOCUMENTS

| 5,186,765 A | | 2/1993 | Arai et al. ................... 148/301 |
| 5,362,339 A | * | 11/1994 | Horimura et al. ............ 148/403 |
| 5,447,034 A | * | 9/1995 | Kuriyama et al. ............ 62/51.1 |
| 5,593,517 A | | 1/1997 | Saito et al. .................. 148/301 |
| 6,022,486 A | * | 2/2000 | Tokai et al. ................... 252/67 |
| 6,042,657 A | * | 3/2000 | Okamura et al. ............ 148/101 |

FOREIGN PATENT DOCUMENTS

| EP | 0 327 293 A2 | * | 8/1989 |
| JP | 1-310269 | | 12/1989 |
| JP | 2-298765 | | 12/1990 |
| JP | 3-1050 | | 1/1991 |
| JP | 4-361526 | | 12/1992 |
| JP | 6-201205 | | 7/1994 |
| WO | 97/31226 | | 8/1997 |

OTHER PUBLICATIONS

N. Luong et al., "Specific Heat and Thermal Expansion in the Heavy $RECu_2$ Compounds", Journal of Magnetic Materials 50 (1985), pp. 153–160.

* cited by examiner

Primary Examiner—John Sheehan
(74) Attorney, Agent, or Firm—Foley & Lardner

(57) ABSTRACT

A cold accumulating material comprising magnetic substance expressed by the general formula:

$$RCu_{1-x}M_{1+x} \qquad (1)$$

wherein R denotes at least one of rare earth element selected from the group consisting of Y, La, Ce, Pr, Nd, Pm, Sm, Eu, Gd, Tb, Dy, Er, Ho, Tm and Yb, M denotes at least one element selected from the group consisting of Ag, Au, Al, Ga, In, Ge, Sn, Sb, Si, Bi, Ni, Pd, Pt, Zn, Co, Rh, Ir, Mn, Fe, Ru, Cr, Mo, W, V, Nb, Ta, Ti, Zr and Hf, and wherein Ni and Ge are not simultaneously selected, and x in atomic ratio satisfies a relation: $-0.95 \geq x \geq 0.90$. According to the above structure, there can be provided a cold accumulating material and a refrigerator using the cold accumulating material capable of exhibiting a remarkable and stable refrigerating performance at an extremely low temperature for a long time.

8 Claims, 4 Drawing Sheets

COLD-ACCUMULATING MATERIAL AND COLD-ACCUMULATING REFRIGERATOR USING THE SAME

FIELD OF THE INVENTION

The present invention relates to a cold accumulating material and a cold accumulating type refrigerator using the same, and more particularly to a cold accumulating material which exhibits significant refrigerating performance at an extremely low temperature region of 10 K or less, and a cold accumulation refrigerator using the cold accumulating material.

BACKGROUND ART

Recently, superconductivity technology has been progressed remarkably and with an expanding application field thereof, development of a small, high performance refrigerator has become indispensable. For such a refrigerator, light weight, small size and high heat efficiency are demanded.

For example in a superconductive MRI apparatus, cryopump and the like, a refrigerator based on such refrigerating cycle as Gifford MacMahon type (GM refrigerator), Starling method has been used. Further, a magnetic floating train absolutely needs a high performance refrigerator. Further, in recent years, a superconductive power storage apparatus (SMES) or a in-magnetic field single crystal pull-up apparatus has been provided with a high performance refrigerator as a main component thereof.

In the above described refrigerator, the operating medium such as compressed He gas flows in a single direction in a cold accumulating unit filled with cold accumulating materials so that the heat energy thereof is supplied to the cold accumulating material. Then, the operating medium expanded here flows in an opposite direction and receives heat energy from the cold accumulating material. As the recuperation effect is improved in this process, the heat efficiency in the operating medium cycle is improved so that a further lower temperature is realized.

As a cold accumulating material for use in the above-described refrigerator, conventionally Cu, Pb and the like have been used. However, these cold accumulating materials have a very small specific heat in extremely low temperatures below 20 K. Therefore, the aforementioned recuperation effect is not exerted sufficiently, so that even if the refrigerator is cyclically operated under an extremely low temperature, the cold accumulating material cannot accumulate sufficient heat energy, and it becomes impossible for the operating medium to receive the sufficient heat energy. As a result, there is posed a problem of that the refrigerator in which the cold accumulating unit filled with aforementioned cold accumulating material is assembled cannot realize the extremely low temperatures.

For the reason, recently to improve the recuperation effect of the cold accumulating unit at extremely low temperature and to realize temperatures nearer absolute zero, use of magnetic cold accumulating material made of intermetallic compound formed from a rare earth element and transition metal element such as $Er_3Ni$, $ErNi$, $ErNi_2$, $HoCu_2$ having a local maximum value of volumetric specific heat and indicating a large volumetric specific heat in an extremely low temperature range of 20 K or less has been considered. By applying the magnetic cold accumulating material to the GM refrigerator, a refrigerating operation to produce an arrival lowest temperature of 4 K is realized.

However, as aforementioned refrigerators are concretely reviewed to be applied to various systems, a technical demand for cooling a large-scaled object under a stable state for a long time is increased, so that it is required to further improve the refrigerating performance (capacity).

By the way, in a cold accumulating unit of the final cooling stage for the refrigerator having a plurality of cooling stages, i.e., in a cold accumulating unit of the second cooling stage for a two-staged expansion type refrigerator, a temperature gradient is formed such that a temperature of a high-temperature side end portion into which the operating medium flows is about 30 K while a temperature of a low-temperature side (downstream side) end portion is about 4 K.

There exist no cold accumulating material of which volumetric specific heat is large at entire region of the broad temperature range. Therefore, in actual, various cold accumulating materials each having a suitable specific heat for the respective temperature regions corresponding to the temperature distribution in the cold accumulating unit are filled in the unit. Namely, a lower temperature side of the cold accumulating unit is filled with cold accumulating materials such as, for example, $HoCu_2$ having a large volumetric specific heat at a broad temperature range of low temperature side, while a higher temperature side of the cold accumulating unit is filled with cold accumulating materials such as, for example, $Er_3Ni$ having a large volumetric specific heat at a broad temperature range of high temperature side.

In this regard, a main factor having a great influence on a capacity (performance) of a cold accumulating type refrigerator operated at an extremely low temperature of about 4 K is a kind of cold accumulating material to be filled in the lower temperature side of the cold accumulating unit. Up to now, as the cold accumulating material to be filled in the lower temperature side of the cold accumulating unit, the cold accumulating materials having various compositions such as $ErNi_2$, $ErNi_{0.9}Co_{0.1}$, $ErNi_{0.8}CO_{0.2}$, $ErRh$ and $HoCu_2$ are investigated and tried to be applied to the actual refrigerator. When these cold accumulating materials are used in the cold accumulating unit of the second stage of the ordinary two-expansion type GM refrigerator, $HoCu_2$ results in a particularly high refrigerating performance at a temperature of 4 K. However, the volumetric specific heat of $HoCu_2$ is still insufficient, so that a remarkable improvement in the refrigerating performance cannot be attained.

In addition, when the cold accumulating materials composed of ferromagnetic substances such as $ErNi_2$ $ErNi_{0.9}Co_{0.1}$, $ErNi_{0.8}Co_{0.2}$ are applied to refrigerators for superconduction systems, such cold accumulating materials are liable to be affected by leakage magnetic field from the superconducting magnet, so that there may be posed a problem of causing a fear, for example, that magnetic force is applied to component parts of the refrigerator thereby to cause a biased wear and deformations to the component parts.

On the other hand, the cold accumulating materials composed of $ErRh$ is antiferromagnetic substance, so that the cold accumulating material has an advantage of being hardly affected by the leakage magnetic field. However, rhodium (Rh) as a constituent is extremely expensive, so that there may be posed a problem that it is extremely difficult to industrially utilize rhodium as a cold accumulating material for a refrigerator in which rhodium is used at an amount of several hundreds grams order.

The present invention has been achieved to solve the above described problems and an object of the invention is to provide a cold accumulating material capable of exhibiting a significant refrigerating performance at an extremely low temperature for a long period of time in a stable condition, and a cold accumulation refrigerator using the same. In addition, another object of the present invention is to provide an MRI apparatus, a superconducting magnet for magnetic floating train, a cryopump and an in-magnetic field single crystal pull-up apparatus capable of exerting an excellent performance for a long period of time by using the aforementioned cold accumulation refrigerator.

DISCLOSURE OF THE INVENTION

To achieve the above objects, the inventors of this invention had prepared a lot of cold accumulating materials having various compositions and specific heat characteristics, and filled the cold accumulating material into cold accumulating unit of a refrigerator. Then influences of the compositions and specific heat characteristics of the materials on a refrigerating performance of the refrigerator, life and durability of the material are comparatively investigated through experiments.

As a result, the following findings and knowledges were obtained. Namely, when a cold accumulating material having a large volumetric specific heat at a limited temperature range of close to 4 K was properly filled in a cold accumulating unit in accordance with a specific heat characteristic at high temperature side of the material, the refrigerating performance of the refrigerator at the temperature range of about 4 K could be significantly improved. For example, in a case where the cold accumulating material having a high specific heat at temperature of 4 K and a low specific heat at temperature of 10 K was used, when the above cold accumulating material was filled in only the low temperature side of the cold accumulating unit by taking the temperature distribution in the cold accumulating unit into consideration, the high specific heat characteristic of the cold accumulating material at temperature of 4 K was effectively utilized, so that performance (capacity) of the refrigerator was remarkably improved.

In addition, when an amount of copper and amounts of other metal components with respect to an amount of rare earth elements were controlled to a proper range, and the amount of rare earth elements was relatively reduced, a cold accumulating material having an excellent specific heat characteristic could be obtained.

Further, in order to realize the above specific heat characteristic, among the magnetic cold accumulating materials having been developed in practical use up to now, the inventors of this invention had paid attention to $HoCo_2$ magnetic material having a high volumetric specific heat at an extremely low temperature of 4 K. When a part of Ho is substituted by other rare earth element, or when a part of Cu is substituted by elements such as transition metals or the like, it was confirmed that aimed specific heat characteristic could be firstly realized. The present invention had been completed on the basis of the aforementioned findings.

That is, the cold accumulating material according to the present invention comprises magnetic substance expressed by the following general formula:

$$RCu_{1-x}M_{1+x} \quad (1)$$

wherein R denotes at least one of rare earth element selected from the group consisting of Y, La, Ce, Pr, Nd, Pm, Sm, Eu, Gd, Tb, Dy, Er, Tm, Ho and Yb, M denotes at least one element selected from the group consisting of Ag, Au, Al, Ga, In, Ge, Sn, Sb, Si, Bi, Ni, Pd, Pt, Zn, Co, Rh, Ir, Mn, Fe, Ru, Cr, Mo, W, V, Nb, Ta, Ti, Zr and Hf, and wherein Ni and Ge are not simultaneously selected, and X in atomic ratio satisfies a relation: $-0.95 \leq x \leq 0.90$.

In another aspect of this invention, the cold accumulating material comprises magnetic substance expressed by the following general formula:

$$Ho_{1-x}R_x(Cu_{1-y}M_y) \quad (2)$$

wherein R denotes at least one of rare earth element selected from the group consisting of Y, La, Ce, Pr, Nd, Pm, Sm, Eu, Gd, Tb, Dy, Er, Tm and Yb, M denotes at least one element selected from the group consisting of Ag, Au, Al, Ga, In, Ge, Sn, Sb, Si, Bi, Ni, Pd, Pt, Zn, Co, Rh, Ir, Mn, Fe, Ru, Cr, Mo, W, V, Nb, Ta, Ti, Zr and Hf, and wherein x and y in atomic ratio satisfy the following relations: $0 \leq xx \leq 0.5$, $0 \leq Y \leq 0.5$, $x+y \neq o$.

Further, it is preferable that the magnetic substance expressed by the general formula of (1) or (2) has a crystal structure composed of hexagonal crystal or orthorhombic crystal at a ratio of 50 vol % or more.

Furthermore, it is preferable that the magnetic substance is antiferromagnetic body.

The cold accumulation refrigerator according to the present invention comprises a plurality of cooling stages each composed of a cold accumulating unit filled with a cold accumulating material through which an operating medium flows from a high temperature-upstream side of the cold accumulating unit of each cooling stage, so that heat is exchanged between the operating medium and the cold accumulating material thereby to obtain a lower temperature at a downstream side of the cold accumulating unit, wherein at least part of the cold accumulating material to be filled in the cold accumulating unit is composed of the cold accumulating material expressed by the general formula of (1) or (2). In this regard, this cold accumulating material is preferably filled in a low-temperature-downstream side (final cooling stage) of the cold accumulating unit.

Further, each of the MRI (magnetic resonance imaging) apparatus, superconducting magnet for magnetic floating train, cryopump and in-magnetic field single crystal pull-up apparatus according to the present invention is characterized by comprising the cold accumulation refrigerator described above.

As is clear from the general formulas, the cold accumulating material of this invention comprises magnetic substance prepared by properly controlling the amounts of Cu component and M component with respect to R component, or by substituting a part of Ho component of magnetic substance having a basic composition of $HoCu_2$ by R component, or by substituting a part of Cu component by M component.

In the magnetic substance expressed by general formulas of (1) or (2), R component is at least one of rare earth element selected from the group consisting of Y, La, Ce, Pr, Nd, Pm, Sm, Eu, Gd, Tb, Dy, Er, Ho (excluded in general formula (2)), Tm and Yb, while M component is at least one element selected from the group consisting of Ag, Au, Al, Ga, In, Ge, Sn, Sb, Si, Bi, Ni, Pd, Pt, Zn, Co, Rh, Ir, Mn, Fe, Ru, Cr, Mo, W, V, Nb, Ta, Ti, Zr and Hf. These R components and M components are added for the purpose of shifting a temperature position of the volumetric specific heat peak of the magnetic substance toward lower temperature side and for broadening a mesial magnitude width of the peak so as to realize a specific heat which is effective as the cold accumulating material.

In the general formula (1), an adjusting amount x in atomic ratio of Cu component and M component with respect to R component is set to a range of −0.95 to 0.90.

When the adjusting amount x is less than −0.95, $RCu_{1-x}M_{1+x}$ substantially come close to a binary system of $RCu_2$, or when the adjusting amount x exceeds 0.90, $RCu_{1-x}M_{1+x}$ substantially come close to a binary system of $RM_2$, so that the mesial magnitude width of the specific heat peak of the magnetic substance will be narrowed. Therefore, the magnetic substance cannot maintain a high specific heat in a broad temperature range, and it becomes impossible to control the temperature position of the specific heat peak. In particular, it is preferable for x to satisfy a relation of $-0.60 \leq xx \leq 0.60$, and more preferably be $-0.40 \leq xx \leq 0.40$.

On the other hand, in the general formula (2), each of substituting amounts x, y of R component and M component with respect to Ho and Cu is set to a range of 0 to 0.5 in atomic ratio. When the above substituting amount x or y exceeds 0.5, the temperature position of the volumetric specific heat peak is greatly shifted, so that aiming volumetric specific heat at temperature range of about 4 K is lowered, or the mesial magnitude width of specific heat peak is excessively broadened thereby to lower the height of the peak. As a result, the volumetric specific heat of the magnetic substance in extremely low temperature range is insufficient, so that the function as a coldatccumulating material is lowered.

In the magnetic substance expressed by the general formula (2), when at least one of the above R component and M component is added to magnetic substance, the temperature position of the volumetric specific heat peak can be shifted to a low temperature side, and the mesial magnitude width of specific heat peak can be effectively broadened. Accordingly, the lower limits of the addition amount (substituting amount) x, y of R component and M component are specified to include zero. However, there is no case where x value and Y value are simultaneously zero to each other. Namely, x and y satisfy a relation: $x+y \neq 0$.

In the magnetic substances expressed by the general formulas (1) and (2), at least one of various rare earth elements described hereinbefore can be used as R component. Among these rare earth elements, however, Ce, Pr, Nd, Er, Dy, Ho (excluded in general formula (2)), Tb and Gd are suitable for improving the specific heat characteristics of the cold accumulating material. In particular, Pr, Nd, Er, Dy, Ho (excluded in general formula (2)) are more preferable.

As the M component, among the above metal elements, Ag, Al, Ni, Ga, In, Ge, Sn, Si are particularly preferable. Al, Ga, Ge, Sn are more preferable. Further, regarding to M component as the same as R component, when a plurality of elements are selected, the mesial magnitude width of the specific heat peak of the magnetic substance and the temperature position of the specific heat peak can be controlled.

Among the magnetic substances expressed by the general formula (1) or (2), the magnetic substance having a crystal structure composed of hexagonal crystal or orthorhombic crystal with a ratio of at least 50 vol. % (50–99.99 vol. %) is particularly preferable. The hexagonal crystal or orthorhombic crystal is a crystal structure having a lower symmetric property in comparison with cubic crystal system. The inventors of this invention have confirmed that the symmetric property of the crystal structure has a great influence on the specific heat characteristic of the cold accumulating material through an effect of crystal field. In this regard, in general, it has been considered that the crystal structure such as cubic crystal system having a high symmetric property which is tend to exhibit a sharp specific heat peak and a narrow mesial magnitude width is preferable as the cold accumulating material.

On the other hand, the inventors of this invention had paid attention to a specific heat peak having a broad mesial magnitude width rather than a sharp peak. Namely, the inventors of this invention had paid attention to a point that the magnetic substance mainly composed of hexagonal crystal or orthorhombic crystal having a low symmetry can rather realize a high specific heat in a broad temperature range.

In addition, the hexagonal crystal has a slightly higher crystal symmetry than the orthorhombic crystal, and exhibits an intermediate crystal symmetry between the cubic crystal system and the orthorhombic crystal, so that the hexagonal crystal has a relatively high peak value of specific heat and a relatively broad mesial magnitude width. That is, the hexagonal crystal is particularly preferable because of its well-balanced specific heat characteristic in a broad temperature range.

Furthermore, in the magnetic substance expressed by the general formula (1) or (2), as is easily analogized from a phase diagram of a substance containing rare earth element, it is difficult to form a single phase structure, so that the magnetic substance generally comprises a plurality of intermetallic compound phases each having a different composition ratio and impurity phases such as oxide and carbide. Even if the aiming compositions are the same, the structural form (metal structure) varies in accordance with a slight difference in a material blending composition, small amount of impurities such as oxygen and carbon, melting temperature, melting atmosphere and solidifying rate. In particular, a cooling process ranging from a melting point to a solidus line has a sensitive influence on the metal structure, and it is extremely difficult to control the cooling process.

It is not preferable that rare earth metal or solid solution thereof is contained in the metal structure of the magnetic substance constituting the cold accumulating material of this invention. Namely, the rare earth metal or solid solution thereof has a low specific heat characteristic in comparison with the intermetallic compound containing rare earth element, so that it is preferable that the rare earth metal or solid solution thereof is not precipitated in the metal structure. In this regard, the metal structure in which rare earth metal or solid solution thereof is not precipitated can be realized by controlling the material blending composition at material preparation stage so that R component is slightly reduced from the aiming composition.

It is preferable that a ratio of the magnetic substance having a crystal structure composed of hexagonal crystal or orthorhombic crystal is set to 50 vol. % or more. When the ratio of the crystal structure is less than 50 vol. %, a magnitude of specific heat is insufficient and the specific heat peak becomes sharp, so that the cold accumulating effect is lowered when used as cold accumulating material. From the above viewpoint, it is preferable that a ratio of the magnetic substance having a crystal structure composed of hexagonal crystal or orthorhombic crystal is set to 70 vol. % or more. The ratio of 80 vol. % or more is furthermore preferable.

As described hereinbefore, the form of the metal structure is liable to be complicatedly affected by a slight difference in a material blending composition, small amount of impurities such as oxygen and carbon, melting temperature, melting atmosphere and solidifying rate or the like. Therefore, it is difficult to definitely specify a method for realizing the above metal structure. In particular, in case of a multi-system of ternary system or more, the phase diagrams become more complicated, so that it is furthermore difficult to realize the desired metal structure.

However, according to knowledge of the inventors of this invention, the following fact had been confirmed. That is, when magnetic particles are prepared from material molten alloy by utilizing rapidly quenching methods such as centrifugal spray method and gas atomizing method and temperature of the molten alloy is set to 100–300 K higher than melting point of the material, it becomes possible to obtain the above metal structure with a desired ratio.

In order that the operating medium (refrigerant) such as helium gas smoothly flow in a cold accumulating unit packed with cold accumulating material, and in order to increase a heat exchange efficiency between the operating medium and the cold accumulating material, and to maintain the function of heat exchange in stable condition, it is preferable to constitute the cold accumulating material from spherical-shaped-magnetic particles having uniform diameters. Concretely to say, in magnetic particles formed as a cold accumulating material, it is preferable that a proportion of magnetic particles having a ratio of a major diameter to a minor diameter (aspect ratio) of not greater than 5 and having a size of 0.01 to 3 mm to the whole of the magnetic particles is controlled to be 70% or more by weight.

The size of the magnetic particles is a factor having a large influence upon the strength of the particles, the cooling functions and the heat transfer characteristics of the refrigerator. If the particle size is smaller than 0.01 mm, the density at which the cold accumulating material is packed in the cold accumulating unit is so high that the resistance to the passage of He gas provided as a refrigerant (operating medium) is abruptly increased and that the cold accumulating material enters the compressor with the flowing He gas and produces wear on the parts thereof to reduce the life of the same.

If the particle size is greater than 3 mm, there is a possibility of occurrence of segregation in the crystalline structure of the particles which renders the particles brittle and, hence, a considerable reduction in the effect of heat transfer between the magnetic particles and the refrigerant, i.e., the He gas. Further, when a proportion of such coarse particles exceeds 30% by weight, there may be a case where the cold accumulating performance is lowered. Accordingly, the average particle size is set to a range of 0.01 to 3 mm, more preferably, to a range of 0.05 to 1.0 mm, furthermore preferably, to a range of 0.1 to 0.5 mm.

To attain practically sufficient cooling functions and strength of the cold accumulating material, the proportion of particles having this size must be set to at least 70% by weight. Preferably, it is set to 80 wt. % or greater, more preferably, 90 wt. % or greater.

The ratio of the major diameter to the minor diameter (aspect ratio) of the magnetic particle in accordance with the present invention is not greater than 5, preferably, not greater than 2 or, more preferably, not greater than 1.3. The setting of the aspect ratio of the magnetic particles greatly influences the strength of the particles and the density at which the particles are packed in the cold accumulating unit. If the aspect ratio is greater than 5, the particles tends to be deformed and broken by mechanical actions and cannot be packed at a high density and with an uniform void. When a proportion of such particles to the whole particles exceeds 30 wt %, there may be a fear of reducing the cold accumulating efficiency.

If magnetic particles are formed by a molten metal quenching method, the dispersion of the particle size and the dispersion of the ratio of the major diameter to the minor diameter (aspect ratio) are remarkably reduced in comparison with those formed by the conventional plasma spray method. The proportion of magnetic particles out of the above range is thereby reduced. Even though the dispersions of the particle size and the major-minor diameter ratio are substantially large, it is easy to classify the particles for the desired use. In this case, the proportion of particles having sizes within the above range to the whole of the magnetic particles packed in the cold accumulating unit is set to 70% or greater, preferably, 80% or greater or, more preferably, 90% or greater to obtain a cold accumulating material having a durability sufficient for practical use.

It is possible to form, based on the molten metal quenching method, magnetic particles having extremely large strength and long life by setting the average crystal grain size of magnetic particles to 0.5 mm or smaller or by making at least part of the alloy structure amorphous.

The surface roughness of the magnetic particles is a factor having a large influence upon the mechanical strength, cooling characteristics, the resistance to passage of the refrigerant, the cold accumulating efficiency and so on. This factor is determined by setting the maximum height $R_{max}$ of irregularities in accordance with JIS (Japanese Industrial Standard) B 0601 to 10 $\mu$m or less, preferably, 5 $\mu$m or less or, more preferably, 2 $\mu$m or less. These surface roughness are measured, for example, by a scanning tunnel microscope (STM roughness meter).

If the surface roughness exceeds 10 $\mu$m $R_{max}$, the possibility of formation of microcracks from which breaking of the particles is started is increased and the resistance to passage of the refrigerant becomes larger to increase the compressor load. In particular, the area of contact between the packed magnetic particles is increased and the rate of transfer of cold heat between the magnetic particles is thereby increased, resulting in a reduction in the cold accumulating efficiency.

In practice, the proportion of magnetic particles to the whole which particles have small defects having a length longer than 10 $\mu$m and which influence the mechanical strength of the magnetic particles is set to 30% or smaller, preferably, 20% or smaller or, more preferably, 10% or smaller.

The method of manufacturing the above magnetic cold accumulating material particles is not particularly limited, and various ordinary manufacturing methods for forming alloy particles can be applied. For example, in accordance with centrifugal spray method, gas atomizing method, rotational electrode method or the like, there can also applicable the method in which a molten alloy having a predetermined composition is dispersed, simultaneously the dispersed molten alloy is rapidly quenched and solidified.

At the time of the above molten alloy quenching treatment, when the composition of the molten alloy is controlled to be slightly Cu-rich, or the solidifying rate is appropriately controlled, it is possible to convert the metal structure in the magnetic cold accumulating material particle into an antiferromagnetic body expressed by the general formula (1) or (2) and a multi-phased metal structure.

In particular, in a case where the magnetic cold accumulating material particles composed of antiferromagnetic body are formed, even if the particles are used as cold accumulating material of a refrigerator for superconducting system, there can be obtained an effect of reducing an influence by leaked magnetic field leaked from a superconducting magnet.

The magnetic cold accumulating material particle having a metal structure in which Cu metal phase is formed has a high mechanical strength. Therefore, even if shocks due to vibrations of the refrigerator are applied to the cold accumulating material during the operation of the refrigerator, or even if an excessively large stress is applied to the cold accumulating material at the time of packing the material into the cold accumulating unit, the cold accumulating material is free from being broken and finely pulverized.

Accordingly, it becomes possible to solve the problem that finely pulverized powder of cold accumulating material is carried by the operating medium and invade into a seal portion of the refrigerator thereby to cause damage. As a result, the damage of the refrigerator due to the pulverization of the cold accumulating material can be effectively prevented.

The cold accumulation refrigerator of the present invention is constructed so as to comprise a plurality of cooling stages and magnetic cold accumulating material particles filled in at least part of a cold accumulating unit disposed at a final cooling stage of the refrigerator. For example, in case of two-staged expansion type refrigerator, the cold accumulating material of this invention is filled in a low-temperature end side of a cold accumulating unit disposed at second stage. While, in case of three-staged expansion type refrigerator, the cold accumulating material of this invention is filled in a low-temperature end side of a cold accumulating unit disposed at third stage. On the other hand, other filling spaces are filled with other cold accumulating material having a specific heat characteristic corresponding to the temperature distribution of the cold accumulating unit.

In the cold accumulating unit of the final cooling stage described above, when the filling amount of the magnetic cold accumulating material particles of this invention is excessively small to be 1 wt. % or less, an improvement in cold accumulating efficiency is not recognized. On the other hand, when the filling amount is excessively large to be 80 wt % or more, a defect of the magnetic cold accumulating material particles of this invention becomes remarkable, thus resulting in lowering the cold accumulating efficiency in the same manner.

Namely, the volumetric specific heat in temperature range other than a temperature at which the volumetric specific heat has its peak, particularly the volumetric specific heat in temperature range of high temperature side becomes relatively small. This small volumetric specific heat has a bad effect on entire cold accumulating unit. As a result, the cold accumulating efficiency is lowered. Accordingly, the filling amount of the magnetic cold accumulating material particles of this invention with respect to whole particles weight to be filled in the cold accumulating unit of the final cooling stage described above is set to 1–80 wt %. However, the filling amount is preferably set to 2–70 wt. %, more preferably to 3–50 wt %.

According to the cold accumulating material thus constructed, the amounts of Cu and M component are appropriately controlled with respect to R component, or a part of constituent of $HoCu_2$ magnetic material having a sharp peak of volumetric specific heat at extremely low temperature range is substituted by other rare earth element or transition metal or the like, so that the temperature position of the specific heat peak is shifted to a low temperature side and the mesial magnitude width of the specific heat peak is broadened thereby to obtain a cold accumulating material having a good specific heat characteristic.

Further, when the cold accumulating material is filled in a low-temperature side end portion of the cold accumulating unit for the final cooling stage of the refrigerator, there can be provided a refrigerator having a high refrigerating performance at temperature range of about 4 K, and capable of maintaining a stable refrigerating performance for a long time.

Furthermore, in an MRI apparatus, a cryopump, a superconducting magnet for magnetic floating train, and a in-magnetic field single crystal pull-up apparatus, since, in all of them, performance of the refrigerator dominates the performance of each apparatus, an MRI apparatus, a cryopump, a superconducting magnet for magnetic floating train, and an in-magnetic field single crystal pull-up apparatus in which the above described refrigerators are assembled therein can exhibit excellent performances for a long term.

BEST MODE FOR CARRYING OUT THE INVENTION

Next, the embodiment of the present invention will be described more concretely with reference to examples mentioned below.

EXAMPLES 1–12

Various metal materials were blended and the blended materials were melted by high frequency melting method thereby to prepare mother alloys each having respective composition shown in left column of Table 1. Then, each of the mother alloys was melted at a temperature 150 K higher than a melting point of the alloy as a composition to prepare the respective molten alloys. Each of the molten alloy was dropped on a rotating disc (rotating speed: $1.5 \times 10^4$ rpm) in an Ar atmosphere having a pressure of 90 KPa, and rapidly quenched and solidified thereby to prepare magnetic particles, respectively.

Each of the prepared magnetic particles was classified according to shape classification so as to obtain particles having an aspect ratio of 1.2 or less, then sieved to select 200 g of cold accumulating materials of Examples 1 to 12 each composed of spherical magnetic particles having diameter of 0.2–0.3 mm, respectively.

EXAMPLES 13–23

Various metal materials were blended and the blended materials were melted by high frequency melting method thereby to prepare mother alloys each having respective composition shown in left column of Table 1. Then, each of the mother alloys was melted at a temperature of 1350 K to prepare the respective molten alloys. Each of the molten alloy was dropped on a rotating disc (rotating speed: $1 \times 10^4$ rpm) in a He atmosphere having a pressure of 90 KPa, and rapidly quenched and solidified thereby to prepare magnetic particles, respectively.

Each of the prepared magnetic particles was classified according to shape classification so as to obtain particles having an aspect ratio of 1.2 or less, then sieved to select 200 g of cold accumulating materials of Examples 13 to 23 each composed of spherical magnetic particles having diameter of 0.2–0.3 mm, respectively.

Crystal structures of thus prepared respective cold accumulating materials of Examples 1–23 were identified by X-ray diffraction method. Note, an existing ratio of the respective crystal structures was calculated from an integrated intensity of X-ray diffraction peak. The calculated results are shown in Table 1.

Figure 1:
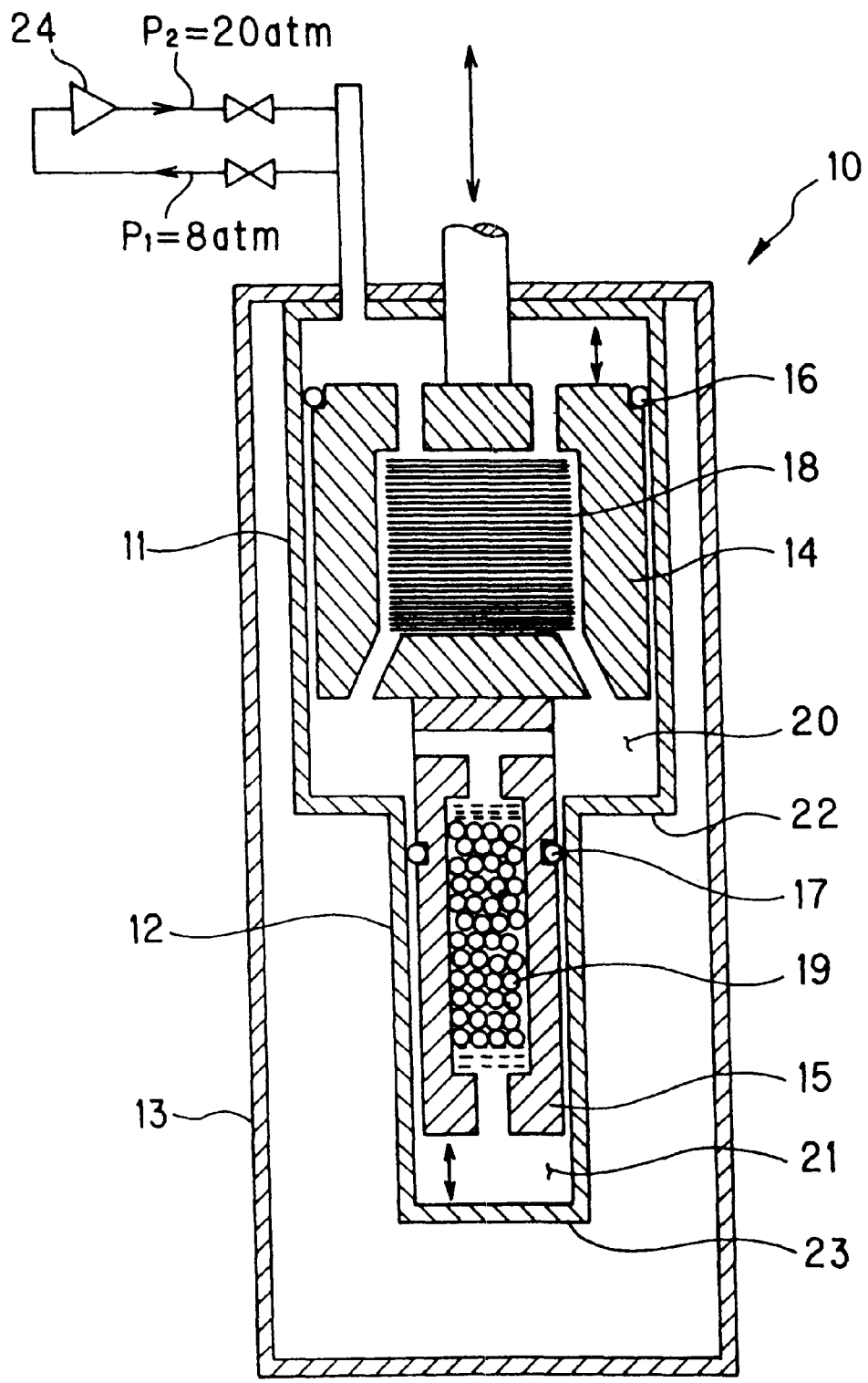
FIG. 1 is a cross sectional view showing an essential portion of a cold accumulation refrigerator (GM refrigerator) according to the present invention.

On the other hand, in order to evaluate the characteristics of thus prepared cold accumulating materials, there was prepared a two-staged expansion type GM refrigerator as shown in FIG. 1. In this regard, the two-staged expansion type GM refrigerator 10 shown in FIG. 1 is one embodiment of a refrigerator of this invention.

The two-staged expansion type GM refrigerator 10 shown in FIG. 1 has a vacuum container 13 containing a first cylinder 11 having a large diameter and a second cylinder 12 having a small diameter, which is connected coaxially to the first cylinder 11. The first cylinder 11 contains a first cold accumulating unit 14 which is freely reciprocatable and the second cylinder 12 also contains a second cold accumulating unit 15 which is freely reciprocatable. Seal rings 16, 17 are disposed between the first cylinder 11 and first cold accumulating unit 14, and between the second cylinder 12 and second cold accumulating unit 15, respectively.

The first cold accumulating unit 14 accommodates a first cold accumulating material 18 made of Cu mesh or the like. The low temperature side of the second cold accumulating unit 15 contains a second cold accumulating material 19 made of a cold accumulating material of this invention for extremely low temperature cold. The first cold accumulating unit 14 and second cold accumulating unit 15 have operating medium (refrigerant) paths for He gas or the like which are provided in gaps of the first cold accumulating material 18 and cold accumulating material 19 for extremely low temperature.

A first expansion chamber 20 is provided between the first cold accumulating unit 14 and second cold accumulating unit 15. A second expansion chamber 21 is provided between the second cold accumulating unit 15 and an end wall of the second cylinder 12. A first cooling stage 22 is provided on a bottom of the first expansion chamber 20 and further a second cooling stage 23 which is colder than the first cooling stage 22 is provided on a bottom of the second expansion chamber 21.

A high pressure operating medium (e.g., He gas) is supplied from a compressor 24 to the aforementioned two-staged GM refrigerator 10. The supplied operating medium passes through the first cold accumulating material 18 accommodated in the first cold accumulating unit 14 and reaches the first expansion chamber 20, and further passes through the second cold accumulating material (second cold accumulating material) 19 accommodated in the second cold accumulating unit 15 and reaches the second expansion chamber 21. At this time, the operating medium supplies heat energy to the respective first cold accumulating materials 18, 19 so that they are cooled.

The operating medium passing through the respective cold accumulating materials 18, 19 is expanded in the respective expansion chambers 20, 21 so as to produce cool atmosphere thereby cooling the respective cooling stages 22, 23. The expanded operating medium flows in the respective cold accumulating materials 18, 19 in opposite direction. The operating medium receives heat energy from the respective cold accumulating materials 18, 19 and is discharged. As recuperation effect is improved in this process, the refrigerator is constructed so that the heat efficiency of the operating medium cycle is improved whereby a further lower temperature is realized.

Then, thus prepared 200 g of each of the cold accumulating materials of Examples 1–23 was packed in a low-temperature side of the second cold accumulating unit of the two-staged expansion type GM refrigerator. In addition, 150 g of $Er_3Ni$ cold accumulating material was packed in a high-temperature side of the second cold accumulating unit thereby to assemble respective refrigerators according to Examples 1–23, and refrigeration tests were carried out. A refrigerating capacity of the respective refrigerators was measured after continuous operation of the refrigerators for 3000 hours.

Note, the refrigerating capacity in the respective Examples is defined as a heat load at a time when a heat load supplied from a heater is applied to the second cooling stage during the operation of the refrigerator and a temperature rise in the second cooling stage is stopped at 4.2 K.

Comparative Examples 1–3

As Comparative Examples 1 and 2, mother alloys having conventional compositions ($Er_3Ni$ and $ErNi_2$) were prepared. On the other hand, as Comparative Example 3, Ho, Cu metal materials were blended without adding R component and M component thereby to prepare a material mixture. The material mixture was then melted by high frequency melting method thereby to prepare a mother alloy having a composition of $HoCu_{2.0}$. Then, each of the mother alloys was melted at a temperature 350 K higher than a melting point of the alloy as a composition to prepare the respective molten alloys. Each of the molten alloys was dropped on a rotating disc (rotating speed: $1\times10^4$ rpm) in an Ar atmosphere having a pressure of 90 KPa, and rapidly quenched and solidified thereby to prepare magnetic particles, respectively.

Each of the prepared magnetic particles was classified according to shape classification so as to obtain particles having an aspect ratio of 1. 2 or less, then sieved to select 200 g of cold accumulating materials of Comparative Examples 1 to 3 each composed of spherical magnetic particles having diameter of 0.2–0.3. mm, respectively.

Crystal structures of thus prepared respective cold accumulating materials of Comparative Examples were identified by X-ray diffraction method, and an existing ratio of the respective crystal structures was calculated from an X-ray diffraction peak. The calculated results are shown in Table 1. In this regard, it was confirmed that 42 vol. % of crystal structure of the cold accumulating material formed of $ErNi_2$ according to Comparative Example 2 was composed of orthorhombic crystal, and remaining 58 vol. % of the crystal structure was composed of cubic crystal.

Comparative Example 4

A mother alloy having the same composition (HoCuAl) as in Example 1 was prepared by high frequency melting method. Thus obtained mother alloy was pulverized by means of a hammer mill to prepare pulverized powder having a grain size of 0.2–0.3 mm. Then, obtained pulverized powder was melted and dispersed by plasma spray method in an Ar atmosphere thereby to work the powder to be spherical particles. In this connection, a finally attainable Ar pressure in the plasma spray treatment was 180 KPa. With respect to this spherical particles, crystal structure was identified and an existing ratio thereof was measured in the same manner as in Example. The results shown in Table 1 were obtained.

Comparative Example 5

The spherical particles having a composition ratio of $Ho_{42}Cu_{29}Al_{29}$ in at. % was prepared under the same conditions as in Example 1. A crystal structure of thus obtained spherical particles was identified by means of X-ray diffraction method whereby results shown in Table 1 were obtained. In addition, when the obtained particles were observed by EPMA method, it was confirmed that Ho layer existed on surfaces of the particles.

Then, thus prepared 200 g of each of the cold accumulating materials of Comparative Examples 1–5 was packed in a low-temperature side of the second cold accumulating unit of the two-staged expansion type GM refrigerator shown in FIG. 1. In addition, 150 g of $Er_3Ni$ cold accumulating material was packed in a high-temperature side of the second cold accumulating unit thereby to assemble respective refrigerators according to Comparative Examples 1–5, and refrigeration tests were carried out. A refrigerating capacity of the respective refrigerators was measured after continuous operation of the refrigerators for 3000 hours.

The results of measuring the refrigerating capacity of the respective refrigerators are shown by the lump in Table 1 hereunder. Note, in Table 1, C.Example means Comparative Example.

TABLE 1

| Sample No. | Composition of Cold Accumulating Material (atomic ratio) | Ratio of Hexagonal Crystal or Orthorhombic Crystal (Vol. %) | Refrigerating Capacity at 4.2K (w) |
| --- | --- | --- | --- |
| Example. 1 | HoCuAl | 94 (h) | 1.26 |
| Example. 2 | $HoCu_{1.2}Al_{0.8}$ | 88 (h) | 1.29 |
| Example. 3 | $HoCu_{0.7}Al_{1.3}$ | 76 (h) | 1.21 |
| Example. 4 | DyCuSn | 93 (h) | 1.07 |
| Example. 5 | HoCuSn | 94 (h) | 1.25 |
| Example. 6 | ErCuSn | 89 (h) | 1.10 |
| Example. 7 | NdCuGe | 94 (h) | 1.06 |
| Example. 8 | DyCuGe | 85 (h) | 1.00 |
| Example. 9 | HoCuGe | 91 (h) | 1.07 |
| Example. 10 | ErCuGe | 96 (h) | 1.09 |
| Example. 11 | $Ho_{0.5}Er_{0.5}CuSn$ | 90 (h) | 1.29 |
| Example. 12 | $HoCuSn_{0.9}Ge_{0.1}$ | 87 (h) | 1.32 |
| Example. 13 | $Ho_{0.9}Pr_{0.1}Cu_2$ | 95 (o) | 1.16 |
| Example. 14 | $Ho_{0.7}Nd_{0.3}Cu_2$ | 88 (o) | 1.20 |
| Example. 15 | $Ho_{0.8}Er_{0.2}Cu_2$ | 96 (o) | 1.18 |
| Example. 16 | $Ho_{0.6}Ce_{0.4}Cu_2$ | 91 (o) | 1.09 |
| Example. 17 | $Ho_{0.95}Dy_{0.05}Cu_2$ | 86 (o) | 1.06 |
| Example. 18 | $Ho_{0.99}Gd_{0.01}Cu_2$ | 90 (o) | 1.11 |
| Example. 19 | $Ho_{0.85}Tb_{0.15}Cu_2$ | 96 (o) | 1.07 |
| Example. 20 | $HoCu_{1.9}Ni_{0.1}$ | 91 (o) | 1.17 |
| Example. 21 | $HoCu_{1.4}Al_{0.6}$ | 86 (o) | 1.16 |
| Example. 22 | $HoCu_{1.8}Ag_{0.2}$ | 97 (o) | 1.25 |
| Example. 23 | $Ho_{0.9}Nd_{0.1}Cu_{1.9}Ag_{0.1}$ | 90 (o) | 1.22 |
| C. Example 1 | $Er_3Ni$ | 90 (o) | 0.52 |
| C. Example 2 | $ErNi_2$ | 42 (o) | 0.37 |
| C. Example 3 | $HoCu_{2.0}$ | 84 (o) | 0.81 |
| C. Example 4 | HoCuAl | 44 (h) | 0.53 |
| C. Example 5 | $Ho_{42}Cu_{29}Al_{29}$ (at. %) | 65 (h) | 0.55 |

Note:
In the ratio of hexagonal crystal or orthorhombic crystal, (h) denotes hexagonal crystal, (o) denotes orthorhombic crystal.

As is clear from the results shown in Table 1, in the refrigerators using the cold accumulating materials of the respective Examples composed of antiferromagnetic substances in which the amounts of Cu and M component are appropriately controlled with respect to R component, a part of Ho is substituted by other rare earth element, or a part of Cu is substituted by transition metal element or the like, the refrigerating capacities at temperature range of about 4 K were confirmed to be 1.2–3.5 times larger than those of Comparative Examples. In addition, in the refrigerators using the cold accumulating materials of the respective Examples, it was confirmed that the mechanical strength of the cold accumulating material is increased, so that deterioration of the cold accumulating material is small. Therefore, decreasing of the refrigerating capacity is small even after the continuous operation of the refrigerator for a long time, thus capable of maintaining a stable refrigerating capacity.

Figure 2:
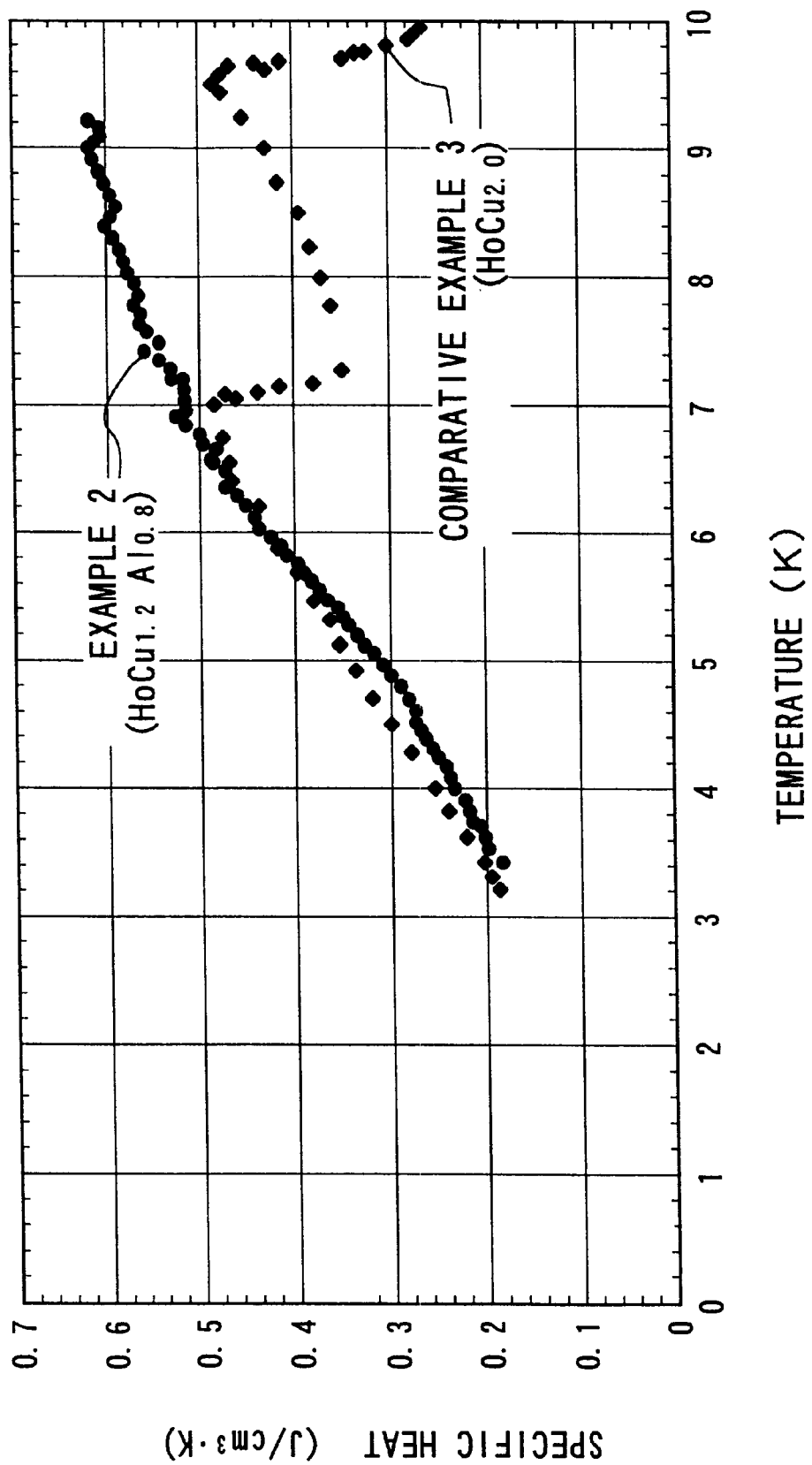
FIG. 2 is a graph comparatively showing specific heat characteristics of the cold accumulating materials of Example and Comparative Example.

FIG. 2 is a graph comparatively showing specific heat characteristics of the cold accumulating material of Example 2 having a composition of $HoCu_{1.2}Al_{0.8}$ and the cold accumulating material of Comparative Example 2 having a composition of $HoCu_{2.0}$. In the cold accumulating material of Example 2, the specific heat in low temperature range becomes large in comparison with the cold accumulating material of Comparative Example 3. Therefore, when the cold accumulating material of Example 2 is packed in the cold accumulating unit of the refrigerator, it can be confirmed that the refrigerating capacity is increased and a rising-up property of refrigerating operation can be improved.

In the cold accumulating material of Comparative Example 4, since the cold accumulating material is prepared by conventional plasma spray method, the crystal structure per se is substantially different from that of the cold accumulating material of this invention using rapidly quenching method. Further, the ratio of the hexagonal crystal in the whole crystal structure is small, so that a sufficient refrigerating capacity is not achieved.

On the other hand, in the cold accumulating material of Comparative Example 5, since the amount of rare earth component (R) is relatively increased and a secondary phase or subsidiary phase containing rare earth metal and solid solution thereof are considerably formed, sufficient cold accumulating effect cannot be recognized.

In contrast, in the cold accumulating material of respective Examples, the amount of rare earth element is relatively reduced, rare earth metal is not precipitated, and constituents other than impurities are all formed to be intermetallic compound. Therefore, the material exhibits an excellent specific heat characteristics, and a high refrigerating capacity is realized.

Next, embodiments of a superconductive MRI apparatus, a superconducting magnet for magnetic floating train, a cryopump, and an in-magnetic field type single crystal pull-up apparatus of the present invention, will be described.

Figure 3:
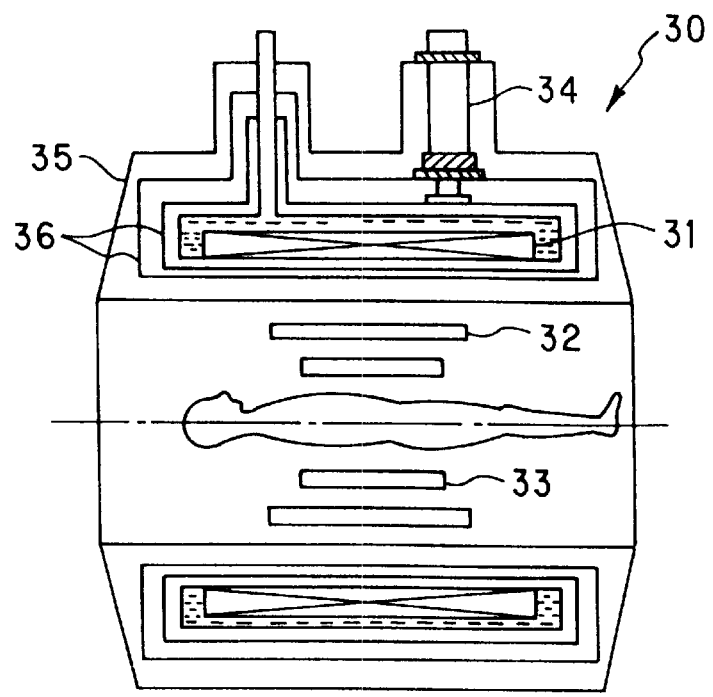
FIG. 3 is a cross sectional view outlining the structure of a superconductive MRI apparatus according to one embodiment of the present invention.

FIG. 3 is a cross sectional view outlining a structure of a superconductive MRI apparatus to which the present invention is applied. The superconductive MRI apparatus 30 shown in FIG. 3 is constituted of a superconductive magnetostatic field coil 31 for biasing a spatially homogeneous and a temporally stable magnetostatic field to a human body, a not shown compensating coil for compensating inhomogeneity of generating magnetic field, a gradient magnetic field coil 32 for providing a magnetic field gradient in a measuring region, and a probe for radio wave transducer 33. And, to cool the superconductive magnetostatic field coil 31, the above described cold accumulation refrigerator 34 of the present invention is employed. Incidentally, in the figure, numeral 35 denotes a cryostat, numeral 36 denotes a radiation shield.

In the superconductive MRI apparatus 30 wherein a cold accumulation refrigerator 34 of the present invention is applied, since an operating temperature of the superconductive magnetostatic field coil 31 can be guaranteed to be stable over a long term, a spatially homogeneous and temporally stable magnetostatic field can be obtained over a long term. Therefore, performance of a superconductive MRI apparatus 30 can be exhibited with stability over a long term.

Figure 4:
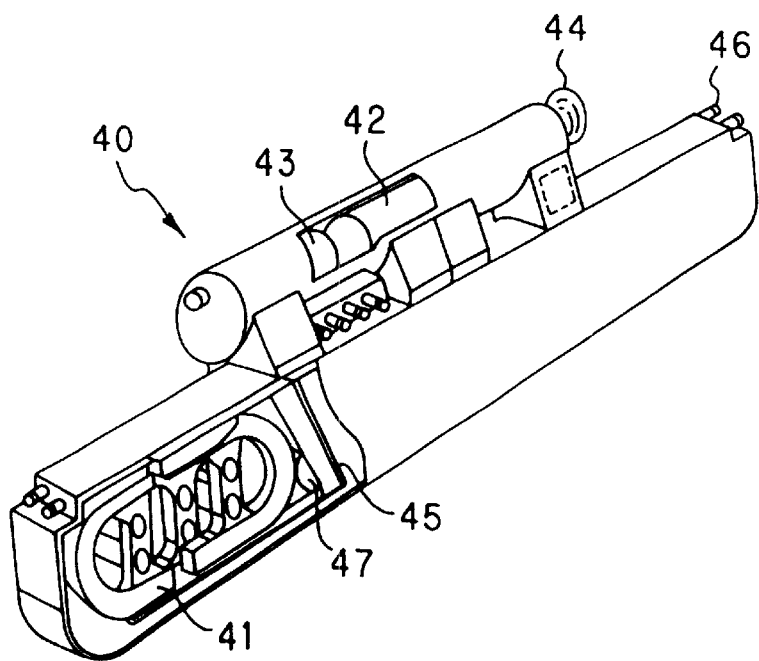
FIG. 4 is a perspective view outlining the essential structure of a superconducting magnet (for magnetic floating train) according to one embodiment of the present invention.

FIG. 4 is a perspective view outlining a structure of an essential portion of a superconducting magnet for magnetic floating train to which a cold accumulation refrigerator of the present invention is applied, a portion of a superconductive magnet 40 for a magnetic floating train being shown. The superconductive magnet 40 for a magnetic floating train shown in FIG. 4 is constituted of a superconductive coil 41, a liquid helium tank 42 for cooling the superconductive coil 41, a liquid nitrogen tank 43 for preventing evaporation of the liquid helium and a cold accumulating type refrigerator 44 of the present invention. Incidentally, in the figure, numeral 45 denotes a laminated adiathermic material, numeral 46 denotes a power lead, numeral 47 denotes a persistent current switch.

In a superconductive magnet 40 for a magnetic floating train wherein a cold accumulation refrigerator 44 of the present invention is employed, since the operation temperature of the superconductive coil 44 can be guaranteed to be stable over a long term, a magnetic filed necessary for magnetic levitation and propulsion of a train can be obtained over a long term with stability. In particular, although acceleration operates in the superconductive magnet 40 for a magnetic floating (levitation) train, the cold accumulation refrigerator 44 of the present invention, being able to maintain an excellent refrigeration performance over a long term even when the acceleration is operated, can remarkably contribute to the long term stability of the magnetic field and the like. Therefore, a magnetic floating train in which such a superconductive magnet 40 is employed can exhibit its reliability over a long term.

Figure 5:
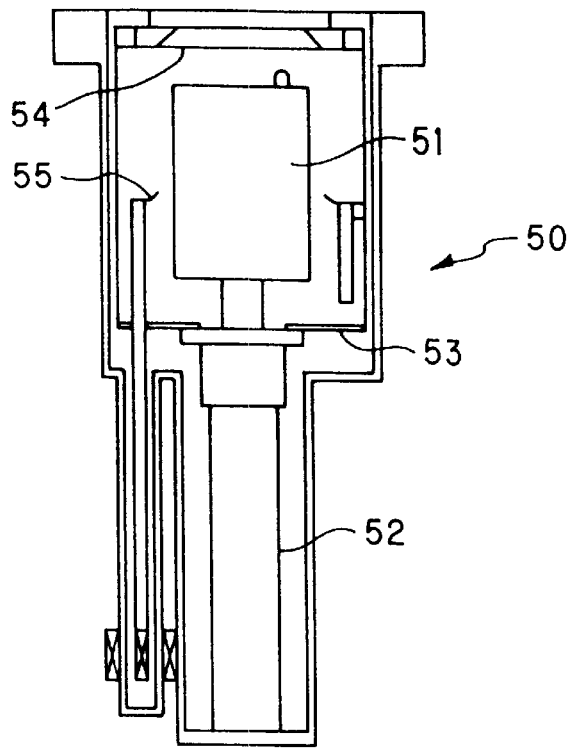
FIG. 5 is a cross sectional view outlining the structure of a cryopump according to one embodiment of the present invention.

FIG. 5 is a cross sectional view outlining a structure of a cryopump to which a cold accumulation refrigerator of the present invention is applied. A cryopump 50 shown in FIG. 5 is constituted of a cryopanel 51 for condensing or absorbing gas molecules, a cold accumulation refrigerator 52 of the present invention for cooling the cryopanel 51 to a predetermined extremely low temperature, a shield 53 disposed therebetween, a baffle 54 disposed at an intake nozzle, and a ring 55 for varying exhaust speed of Argon, nitrogen, hydrogen gas or the like.

With a cryopump 50 involving the cold accumulation refrigerator 52 of the present invention, the operating temperature of the cryopanel 51 can be guaranteed to be stable over a long term. Therefore, the performance of the cryopump 50 can be exhibited over a long term with stability.

Figure 6:
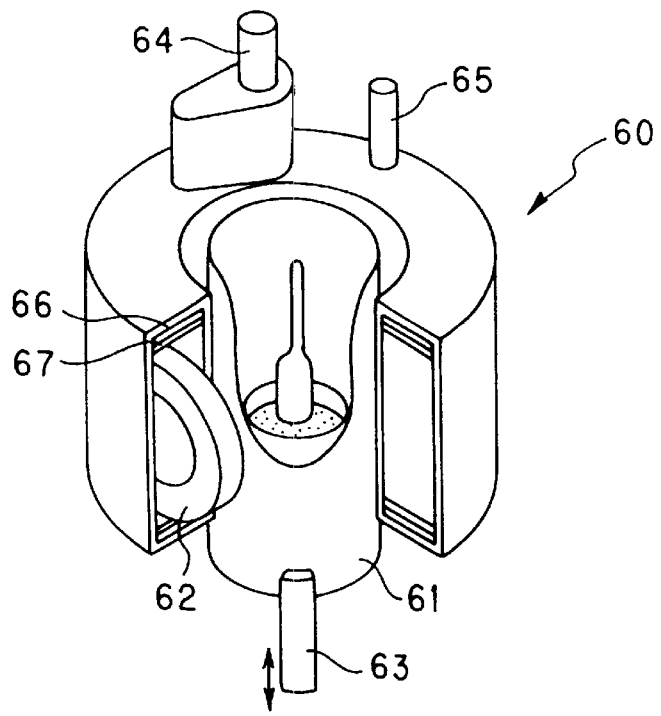
FIG. 6 is a perspective view outlining the essential structure of an in-magnetic field type single crystal pull-up apparatus according to one embodiment of the present invention.

FIG. 6 is a perspective view outlining a structure of an in-magnetic field type single crystal pull-up apparatus involving the cold accumulation refrigerator of the present invention. The in-magnetic field type single crystal pull-up apparatus 60 shown in FIG. 6 is constituted of a crucible for melting raw material, a heater, a single crystal pull-up portion 61 possessing a mechanism of pulling up a single crystal, a superconductive coil 62 for applying a magnetostatic field to a raw material melt, and an elevation mechanism 63 of the single crystal pulling up portion 61. And, as a cooling means of the superconductive coil 62, the above described cold accumulation type refrigerator 64 of the present invention is employed. Now, in the figure, numeral 65 denotes a current lead, numeral 66 denotes a heat shielding plate, numeral 67 denotes a helium container.

With the in-magnetic field type single crystal pull-up apparatus 60 involving a cold accumulation refrigerator 64 of the present invention, since the operating temperature of the superconductive coil 62 can be guaranteed to be stable over a long term, a good magnetic field for suppressing convection of the raw material melt of the single crystal can be obtained over a long term. Therefore, the performance of the in-magnetic field application type single crystal pull-up apparatus 60 can be exhibited with stability over a long term.

INDUSTRIAL APPLICABILITY

As is evident from the above described embodiments, according to the cold accumulating material of the present invention, the amounts of copper and other metals are appropriately controlled with respect to rare earth component, or a part of constituent of $HoCu_2$ magnetic material having a sharp peak of volumetric specific heat at extremely low temperature range is substituted by the other rare earth element or transition metal or the like, so that the temperature position of the specific heat peak is shifted to a low-temperature side and the mesial magnitude width of the specific heat peak is broadened thereby to obtain a cold accumulating material having a good specific heat characteristic.

Further, when the cold accumulating material is filled in a low-temperature side end portion of the cold accumulating unit for the final cooling stage of the refrigerator, there can be provided a refrigerator having a high refrigerating capacity at temperature range of about 4 K, and capable of maintaining a stable refrigerating performance for a long time.

Accordingly, the refrigerator using the cold accumulating material for extremely low temperature enables the refrigerator to maintain an excellent refrigerating performance with good repeatability for a long time. Further, an MRI apparatus, a cryopump, a superconducting magnet for magnetic floating train, and an in-magnetic field type single crystal pull-up apparatus into which aforementioned refrigerators are assembled can exhibit excellent performances for a long term.

What is claimed is:

1. A cold accumulating material comprising a magnetic substance having a crystal structure and expressed by the general formula:

$$RCu_{1-x}M_{1+x} \tag{1}$$

wherein:
R denotes at least one rare earth element selected from the group consisting of Y, La, Ce, Pr, Nd, Pm, Sm, Eu, Gd, Tb, Dy, Er, Ho, Tm and Yb;
M denotes at least one element selected from the group consisting of Ag, Au, Al, Ga, In, Ge, Sn, Sb, Si, Bi, Ni, Pd, Pt, Zn, Co, Rh, Ir, Mn, Fe, Ru, Cr, Mo, W, V, Nb, Ta, Ti, Zr and Hf;

wherein:
Ni and Ge are not simultaneously selected, and
x in atomic ratio satisfies a relation: $-0.95 \leq x \leq 0.90$; and wherein:
said crystal structure comprises 50 volume % or more, based on a total volume of said crystal structure, of either a hexagonal crystal phase or an orthorhombic crystal phase.

2. A cold accumulating material comprising a magnetic substance having a crystal structure and expressed by the general formula:

$$Ho_{1-x}R_x(Cu_{1-y}M_y)_2 \qquad (2)$$

wherein:

R denotes at least one rare earth element selected from the group consisting of Y, La, Ce, Pr, Nd, Pm, Sm, Eu, Gd, Tb, Dy, Er, Tm and Yb;

M denotes at lest one element selected from the group consisting of Ag, Au, Al, Ga, In, Ge, Sb, Si, Bi, Ni, Pd, Pt, Zn, Co, Rh, Ir, Mn, Fe, Ru, Cr, Mo, W, V, Nb, Ta, Ti, Zr and Hf;

wherein:

x and y in atomic ratio satisfy the following relations:
$0 \leq x\ 0.5$;
$0 \leq y \leq 0.5$;
$x+y \neq 0$; and wherein:

said crystal structure comprises 50 volume % or more, based on a total volume of said crystal structure, of either a hexagonal crystal phase or an orthorhombic crystal phase.

3. A cold accumulating material according to claim 1, wherein said magnetic substance is an antiferromagnetic body.

4. A cold accumulation refrigerator comprising a plurality of cooling stages each composed of a cold accumulating unit filled with a cold accumulating material through which an operating medium flows from a high temperature-upstream side of the cold accumulating unit of each cooling stage, so that heat is exchanged between the operating medium and the cold accumulating material thereby to obtain a lower temperature at a downstream side of the cold accumulating unit, wherein at least part of the cold accumulating material filled in the cold accumulating unit is composed of the cold accumulating material as set forth in claim 1.

5. A superconducting magnet comprising a cold accumulation refrigerator as set forth in claim 4.

6. An MRI (Magnetic Resonance Imaging) apparatus comprising a cold accumulation refrigerator as set forth in claim 4.

7. A cryopump comprising a cold accumulation refrigerator as set forth in claim 4.

8. A in-magnetic field single crystal pull-up apparatus comprising a cold accumulation refrigerator as set forth in claim 4.

* * * * *